(12) United States Patent
Koch et al.

(10) Patent No.: US 8,840,519 B2
(45) Date of Patent: Sep. 23, 2014

(54) CONFIGURATION FOR COMPACT PLANETARY TRANSMISSION

(75) Inventors: Thomas D. Koch, Green Valley, AZ (US); Justin Floro, East Peoria, IL (US); Michael Gross, Peoria, IL (US); Kevin G. Meyer, Germantown Hills, IL (US); Kevin J. Knox, Peoria, IL (US); James Rice, Deer Creek, IL (US); James Elmer Winzeler, East Peoria, IL (US); Peter H. Hodges, Peoria, IL (US); Perry G. Cruce, Marquette Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/567,636

(22) Filed: Aug. 6, 2012

(65) Prior Publication Data

US 2014/0038767 A1    Feb. 6, 2014

(51) Int. Cl.
*F16H 3/62*        (2006.01)
*F16H 57/10*       (2006.01)

(52) U.S. Cl.
USPC ............................. 475/279; 475/286; 475/290

(58) Field of Classification Search
USPC .......... 475/271, 275, 279, 286, 290, 317, 323
See application file for complete search history.

(56) References Cited

U.S. PATENT DOCUMENTS

| | | | |
|---|---|---|---|
| 6,176,803 B1 * | 1/2001 | Meyer et al. ................... | 475/286 |
| 7,377,872 B2 * | 5/2008 | Jang ............................... | 475/275 |
| 7,963,876 B2 | 6/2011 | Phillips | |
| 8,083,630 B2 * | 12/2011 | Rice et al. ...................... | 475/280 |
| 8,088,033 B2 | 1/2012 | Boss et al. | |
| 8,517,885 B2 * | 8/2013 | Shim et al. ..................... | 475/276 |

* cited by examiner

*Primary Examiner* — Jacob S Scott
(74) *Attorney, Agent, or Firm* — Miller, Matthias & Hull

(57) ABSTRACT

A compact five-speed transmission planetary gear train includes a first, second, third, and fourth planetary gear sets between an input and an output as well as first, second, third, and fourth brakes and first and second clutches. The first, second, third and fourth brakes and first and second clutches are selectively actuatable to provide five different forward speeds and a four different reverse speeds between the input and the output. The compact transmission also includes a first brake, second brake, third brake, fourth brake, first clutch, and second clutch associated with the planetary gear train, the first brake, second brake, third brake, fourth brake, first clutch, and second clutch being configured such that setting each forward and reverse speed of the compact transmission is accomplished via actuation of two of the first brake, second brake, third brake, fourth brake, first clutch, and second clutch.

20 Claims, 12 Drawing Sheets

|  |  | Clutches | | Brakes | | | |
| --- | --- | --- | --- | --- | --- | --- | --- |
| Ratio | Gear | Second (51) | First (50) | Third (48) | Fourth (49) | Second (47) | First (46) |
| 4.104 | 1F |  | X |  |  | X |  |
| 3.096 | 2F |  | X |  | X |  |  |
| 2.362 | 3F |  | X | X |  |  |  |
| 1.73 | 4F |  |  |  | X | X |  |
| 1.000 | 5F | X | X |  |  |  |  |
| -2.431 | 1R |  |  |  | X |  | X |
| -1.854 | 2R |  |  | X |  |  | X |
| -1.391 | 3R |  |  |  |  | X | X |
| -0.785 | 4R | X |  |  |  |  | X |

CONFIGURATION FOR COMPACT PLANETARY TRANSMISSION

TECHNICAL FIELD OF THE DISCLOSURE

The present disclosure relates to mechanical power transmission and, more particularly, relates to a compact and efficient 5-speed transmission.

BACKGROUND OF THE DISCLOSURE

Because most power sources have a limited range of output RPM, machines employing such power sources will also typically employ a multispeed transmission to provide a greater range of machine speed. One type of multispeed transmission is the planetary transmission. Such a transmission generally includes many planetary gear sets linked together in various ways, with selectable elements used to select the input/output ratio.

However, planetary gear sets take up a significant amount of space, and it is typically required to either settle for a limited number of gear ranges or allow for a greater installation footprint to include a greater number of planetary gear sets. For example, U.S. Pat. No. 7,963,876 to Phillips minimizes the number of planetary gear sets used, but also provides only three reverse speeds. The transmission described in the Phillips patent includes four planetary gear sets and various clutches and brakes. The clutches and brakes are selectively engageable to provide different speed ratios, but only three reverse speed ratios are enabled. Thus, while up to seven forward speeds are shown, fewer than half as many reverse ratios are available within the Phillips system.

The present disclosure is directed to a system that addresses one or more of the problems set forth above. However, it should be appreciated that the solution of any particular problem is not a limitation on the scope of this disclosure nor of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In accordance with one aspect of the present disclosure, a machine power transmission is provided having a planetary gear train with exactly four planetary gear sets including a first planetary gear set having a first sun gear, first ring gear, and first carrier, a second planetary gear set having a second sun gear, second ring gear, and second carrier, a third planetary gear set having a third sun gear, third ring gear, and third carrier, and a fourth planetary gear set having a fourth sun gear, fourth ring gear, and fourth carrier. The machine power transmission includes an input to the planetary gear train and an output from the planetary gear train as well as a first brake, second brake, third brake, fourth brake, first clutch, and second clutch associated with the planetary gear train, the first brake being linked to the first ring gear, the second brake being linked to the second carrier, the third brake being linked to the second ring gear and third ring gear, the fourth brake being linked to the fourth ring gear, the first clutch linking the first sun gear to the input, and the second clutch linking the fourth sun gear to the output, such that selective actuation of one or more of the first brake, second brake, third brake, fourth brake, first clutch, and second clutch provides five forward speeds and four reverse speeds of the transmission.

In accordance with another aspect of the present disclosure, a planetary gear train is provided having first, second, third, and fourth planetary gear sets between an input and an output. The planetary gear train further includes first, second, third and fourth brakes and first and second clutches, the first, second, third and fourth brakes and first and second clutches being selectively actuatable to provide five different forward speeds and four different reverse speeds between the input and the output by actuation as follows for each speed: [1F: first clutch, second brake], [2F: first clutch, fourth brake], [3F: first clutch, third brake], [4F: second brake, fourth brake], [5F: first clutch, second clutch], [1R: first brake, fourth brake], [2R: first brake, third brake], [3R: first brake, second brake], and [4R: second clutch, first brake].

In accordance with yet another aspect of the present disclosure, a compact transmission is provided having five forward speeds and four reverse speeds. The compact transmission includes a first planetary gear set having a first sun gear, first ring gear, and first carrier, a second planetary gear set having a second sun gear, second ring gear, and second carrier, a third planetary gear set having a third sun gear, third ring gear, and third carrier, and a fourth planetary gear set having a fourth sun gear, fourth ring gear, and fourth carrier. The compact transmission further includes an input to the planetary gear train and an output from the planetary gear train. The compact transmission also includes a first brake, second brake, third brake, fourth brake, first clutch, and second clutch associated with the planetary gear train, the first brake, second brake, third brake, fourth brake, first clutch, and second clutch being configured such that setting each forward and reverse speed of the compact transmission requires the actuation of exactly two of the first brake, second brake, third brake, fourth brake, first clutch, and second clutch.

Other features and advantages of the disclosed systems and principles will become apparent from reading the following detailed disclosure in conjunction with the included drawing figures.

DETAILED DESCRIPTION OF THE DISCLOSURE

The present disclosure provides a configuration for a compact five-speed planetary transmission. The transmission in an embodiment includes four planetary gear sets configured via four static clutches (also referred to herein as brakes) and two rotating clutches. In an embodiment, these elements are located such that selective activation provides five forward speeds as well as four or more reverse speeds.

Figure 1:
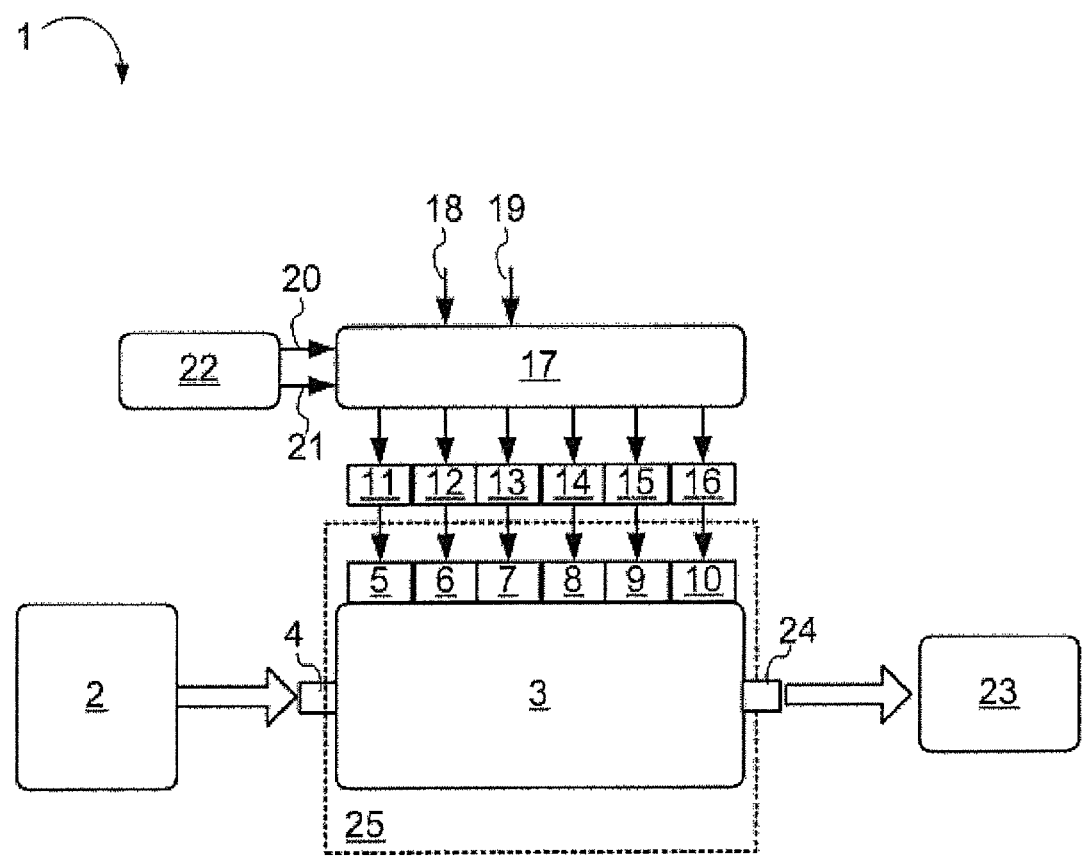
FIG. 1 is a schematic diagram of a transmission system and associated systems in keeping with an embodiment of the described principles.

Having discussed various embodiments in overview, we turn now to detailed descriptions of certain embodiments. FIG. 1 is a system schematic showing input, output, and control structures of a machine power system 1 in accordance with an embodiment. In the illustrated configuration, the machine power system 1 includes a power input device 2, which may be an engine such as a fuel-burning engine (gas, diesel, propane, LNG, kerosene, etc.) or a motor, e.g., an electric or hydraulic motor.

The power input device 2 is linked into a planetary gear set 3 via an input shaft 4. The state of the planetary gear set 3 (e.g., the output speed and direction of the planetary gear set 3) is controlled by a first brake 5, second brake 6, third brake 7, fourth brake 8, first clutch 9, and second clutch 10. The planetary gear set 3, first brake 5, second brake 6, third brake 7, fourth brake 8, first clutch 9, and second clutch 10 may be referred to collectively as the transmission 25.

Each brake and clutch is controlled by a control element such as an electronic solenoid valve, such that the machine power system 1 includes a first solenoid 11, second solenoid 12, third solenoid 13, fourth solenoid 14, fifth solenoid 15 and sixth solenoid 16 linked to the first brake 5, second brake 6, third brake 7, fourth brake 8, first clutch 9, and second clutch 10 respectively.

A controller 17 is connected and configured to control each of the first solenoid 11, second solenoid 12, third solenoid 13, fourth solenoid 14, fifth solenoid 15 and sixth solenoid 16. In an embodiment, the controller 17 actuates the solenoids to set the state of the planetary gear set 3 in response to a plurality of inputs. In the illustrated embodiment, the plurality of inputs includes a speed input 18 from the power input device 2, and the controller 17 may also provide an acceleration output 19 to the power input device. The plurality of inputs further includes an acceleration input 20 and a direction input 21, both from a user interface module 22.

The user interface module 22 may be an interface to personnel in a machine cab or may be an interface to another electronic system, e.g., for remote control or autonomous operation. The controller 17 in an embodiment is a digital processor operating in accordance with computer-executable instructions and data read from one or more non-transitory computer-readable media, e.g., a volatile or nonvolatile memory associated with controller 17. The volatile or nonvolatile memory associated with controller 17 may include a flash drive, optical drive, magnetic drive and/or other appropriate memory device.

The planetary gear set 3 provides power to a final drive 23 via an output shaft 24, with the speed range and direction of the rotation of the output shaft 24 being set by the controller 17 via setting of the first solenoid 11, second solenoid 12, third solenoid 13, fourth solenoid 14, fifth solenoid 15 and sixth solenoid 16.

Figure 2:
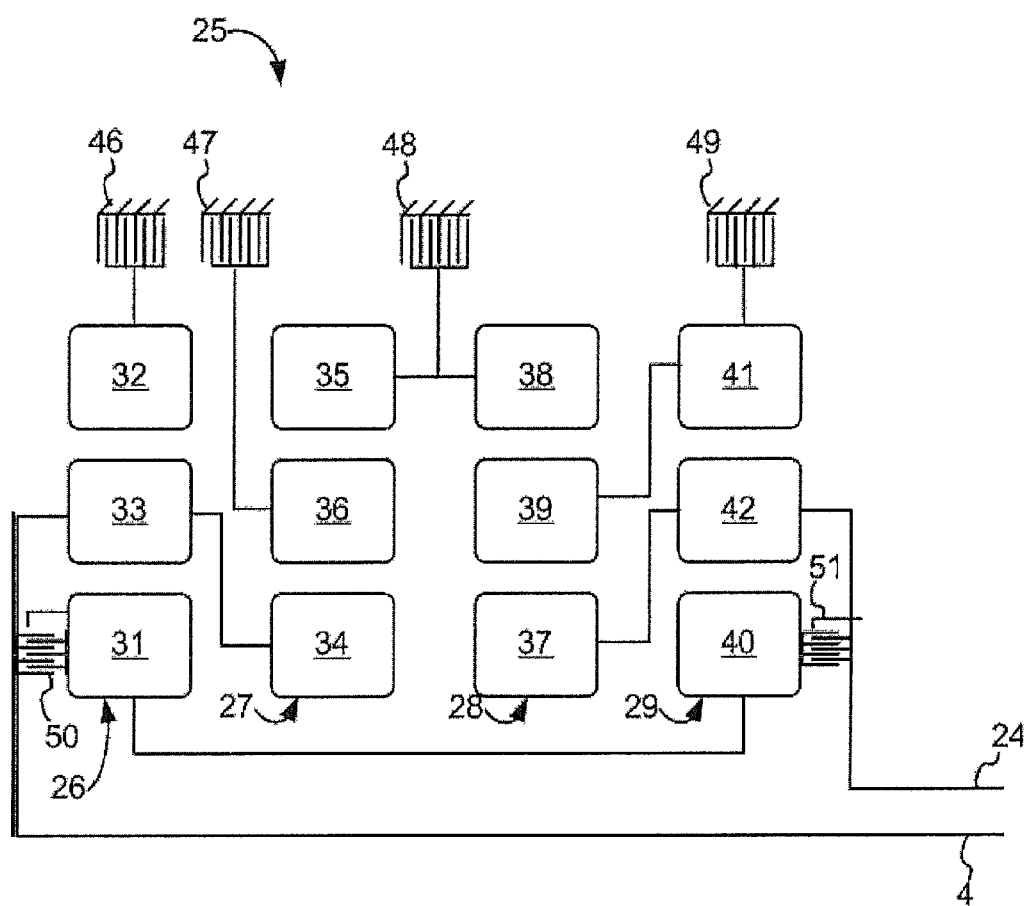
FIG. 2 is a planetary gear set diagram showing a transmission system in accordance with an embodiment of the described principles.

As will be seen from FIG. 2, the illustrated transmission 25 is implemented in an embodiment as a compact planetary gear system having four individual interconnected planetary gear sets. In particular, the transmission 25 as illustrated includes a first planetary gear set 26, a second planetary gear set 27, a third planetary gear set 28, and a fourth planetary gear set 29. Each planetary gear set includes a sun gear, ring gear and carrier.

Thus, the first planetary gear set 26 comprises a first sun gear 31, a first ring gear 32, and a first carrier 33; the second planetary gear set 27 includes a second sun gear 34, a second ring gear 35, and a second carrier 36; the third planetary gear set 28 includes a third sun gear 37, a third ring gear 38, and a third carrier 39; and the fourth planetary gear set 29 includes a fourth sun gear 40, a fourth ring gear 41, and a fourth carrier 42.

As noted above, the transmission 25 in an embodiment also includes a plurality of brakes and clutches. In the illustrated configuration, a first brake 46 is linked to the first ring gear 32 of the first planetary gear set 26, a second brake 47 is linked to the second carrier 36 of the second planetary gear set 27, a third brake 48 is linked to the second ring gear 35 and the third ring gear 38 of the second planetary gear set 27 and third planetary gear set 28 respectively, and a fourth brake 49 is linked to the fourth ring gear 41 of the fourth planetary gear set 29. Each brake 46, 47, 48, 49 is configured to selectively tie the associated component to the transmission case or other static structure and thus limit the rotation of the associated component.

Moreover, in the illustrated configuration, a first clutch 50 is linked to the first sun gear 31 of the first planetary gear set 26, and a second clutch 51 is linked to the fourth sun gear 40 of the third planetary gear set 28. The first clutch 50 is selectively actuatable to link the first sun gear 31 to the first carrier 33 of the first planetary gear set 26 and to the input 4. The second clutch 51 is selectively actuatable to link the fourth ring gear 40 to the fourth carrier 42, which is also linked to the output 24.

Figure 3:
FIG. 3 is a gear ratio chart showing ratios as well as clutch and brake activation patterns for each gear in accordance with the transmission of FIG. 2.

In operation, selective actuation of one or more of the first brake 46, second brake 47, third brake 48, fourth brake 49, first clutch 50 and second clutch 51 serves to place the transmission 25 into a selected state, e.g., one of five forward speeds or one of four or more reverse speeds. The chart 55 of FIG. 3 shows the corresponding states for selective actuation in the illustrated embodiment. As can be seen, the brakes and clutches are actuated in various patterns to select a gear ratio and transmission direction.

In the illustrated embodiment, the following associations of [Ratio, Gear, Second Clutch, First Clutch, Third Brake, Fourth Brake, Second Brake, First Brake] respectively are exhibited: [4.104, 1F, Off, On, Off, Off, On, Off]; [3.096, 2F, Off, On, Off, On, Off, Off]; [2.362, 3F, Off, On, On, Off, Off, Off]; [1.73, 4F, Off, Off, Off, On, On, Off]; [1.000, 5F, On, On, Off, Off, Off, Off]; [−2.431, 1R, Off, Off, Off, On, Off, On]; [−1.854, 2R, Off, Off, On, Off, Off, On]; [−1.391, 3R, Off, Off, Off, Off, On, On]; and [−0.785, 4R, On, Off, Off, Off, Off, On].

It will be appreciated that the power flow through the transmission 25 depends upon the selected direction and ratio. Thus, for each selectable gear 1F, 2F, 3F, 4F, 5F, 1R, 2R, 3R, and 4R, the power flow through the transmission 25 is shown in respective ones of the power flow diagrams included in FIGS. 4-12.

Figure 4:
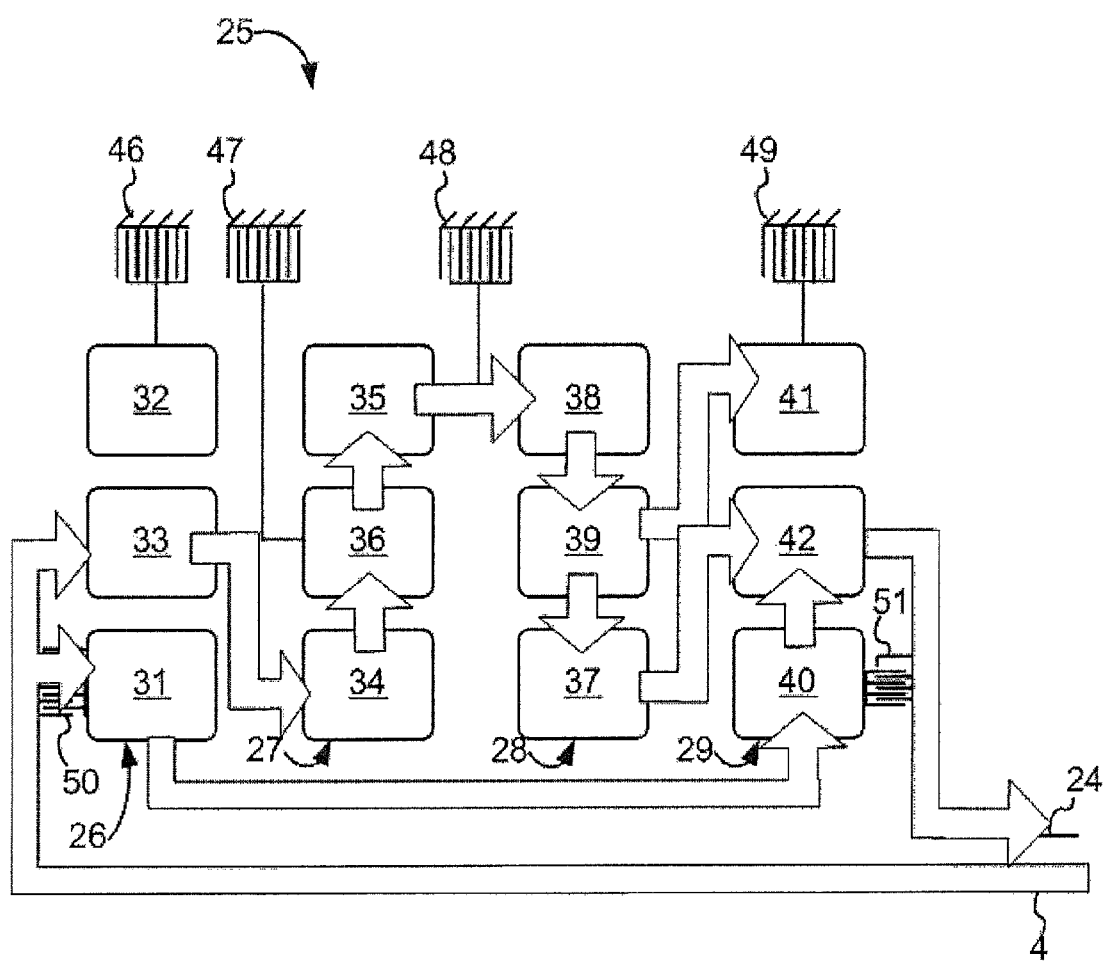
FIG. 4 is a power flow diagram showing the power flow in the transmission of FIG. 2 in a 1F configuration.

FIG. 4 thus shows the power flow through the transmission 25 when the transmission is in the 1F state (first forward gear). The states of the [Second Clutch, First Clutch, Third Brake, Fourth Brake, Second Brake, First Brake] respectively are [Off, On, Off, Off, On, Off] in this configuration.

Figure 5:
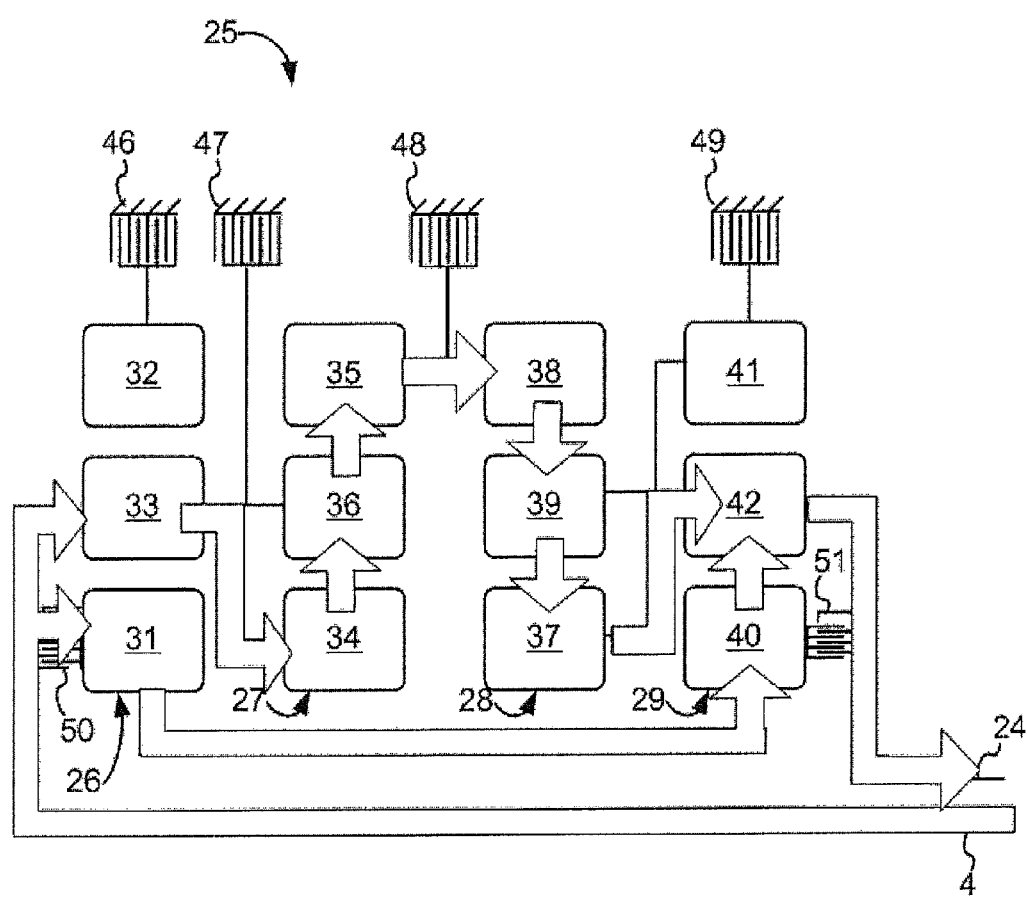
FIG. 5 is a power flow diagram showing the power flow in the transmission of FIG. 2 in a 2F configuration.

FIG. 5 shows the power flow through the transmission 25 when the transmission is in the 2F state (second forward gear). The states of the [Second Clutch, First Clutch, Third Brake, Fourth Brake, Second Brake, First Brake] in this configuration are [Off, On, Off, On, Off, Off] respectively.

Figure 6:
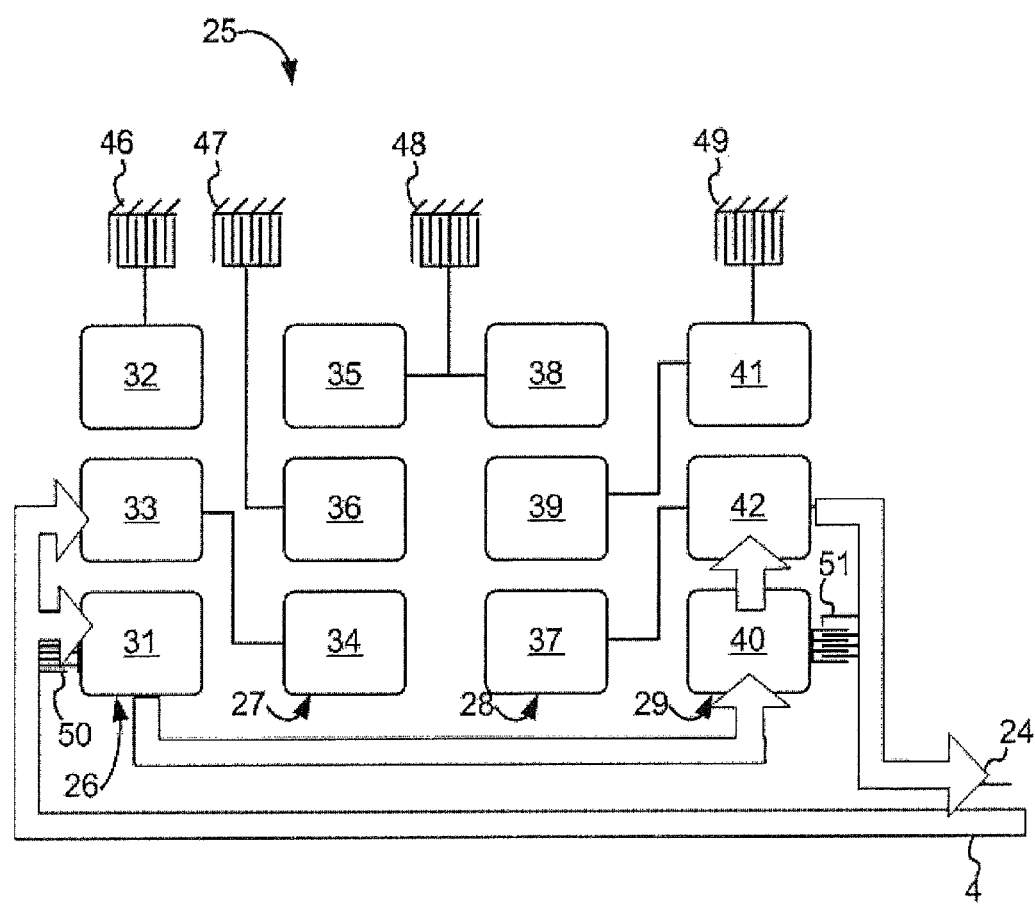
FIG. 6 is a power flow diagram showing the power flow in the transmission of FIG. 2 in a 3F configuration.

Shown in FIG. 6 is the power flow through the transmission 25 when the transmission is in the 3F state (third forward gear). The states of the [Second Clutch, First Clutch, Third Brake, Fourth Brake, Second Brake, First Brake] in this state are [Off, On, On, Off, Off, Off] respectively.

Figure 7:
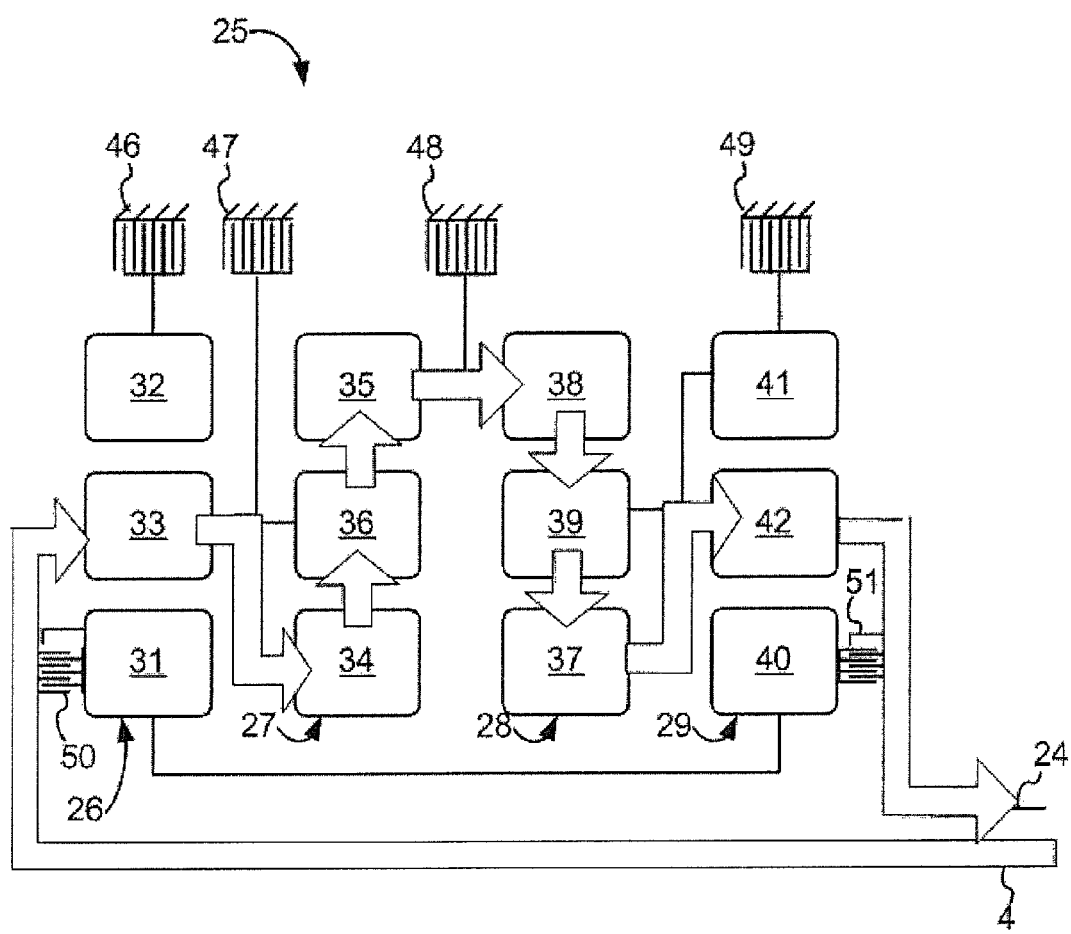
FIG. 7 is a power flow diagram showing the power flow in the transmission of FIG. 2 in a 4F configuration.

The power flow diagram of FIG. 7 illustrates the power flow through the transmission 25 when the transmission is in the 4F state (fourth forward gear). The states of the [Second Clutch, First Clutch, Third Brake, Fourth Brake, Second Brake, First Brake] in this state are [Off, Off, Off, On, On, Off] respectively.

Figure 8:
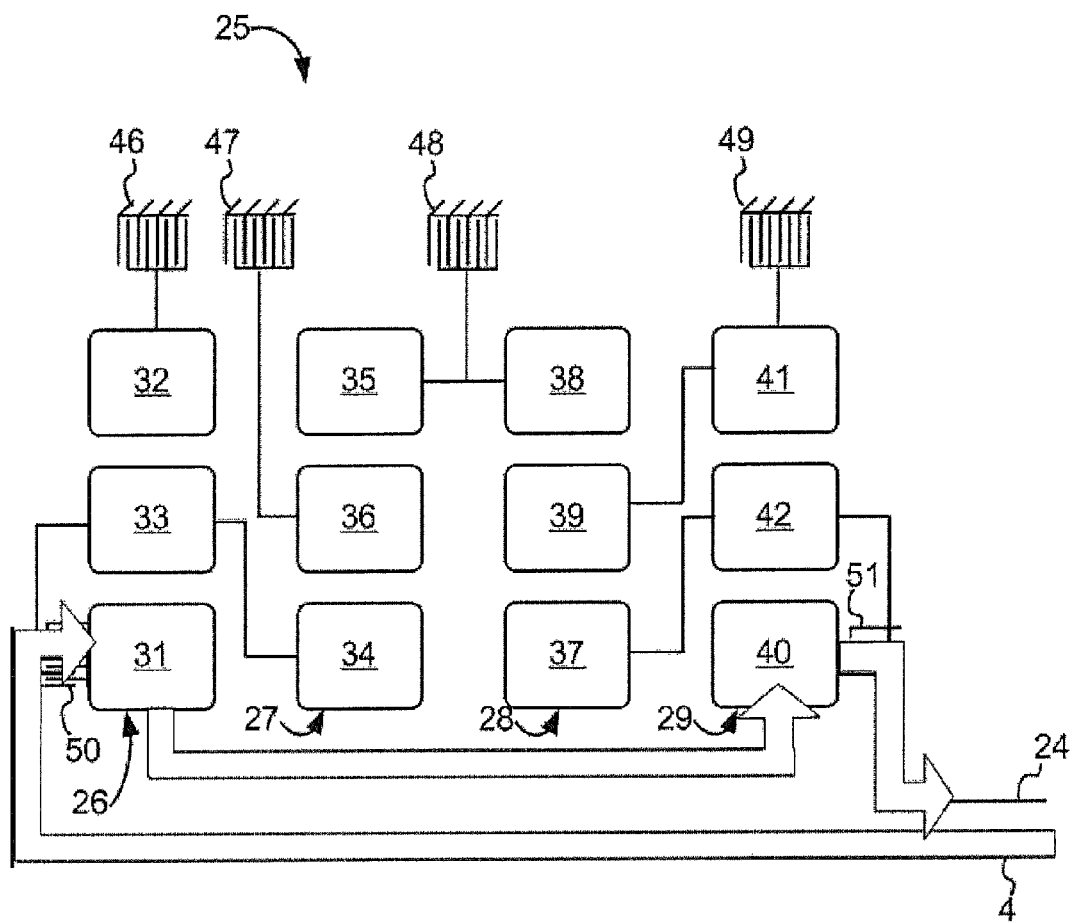
FIG. 8 is a power flow diagram showing the power flow in the transmission of FIG. 2 in a 5F configuration.

For the final forward state, 5F, FIG. 8 shows the power flow through the transmission 25. The states of the [Second Clutch, First Clutch, Third Brake, Fourth Brake, Second Brake, First Brake] in this state are [On, On, Off, Off, Off, Off] respectively.

Figure 9:
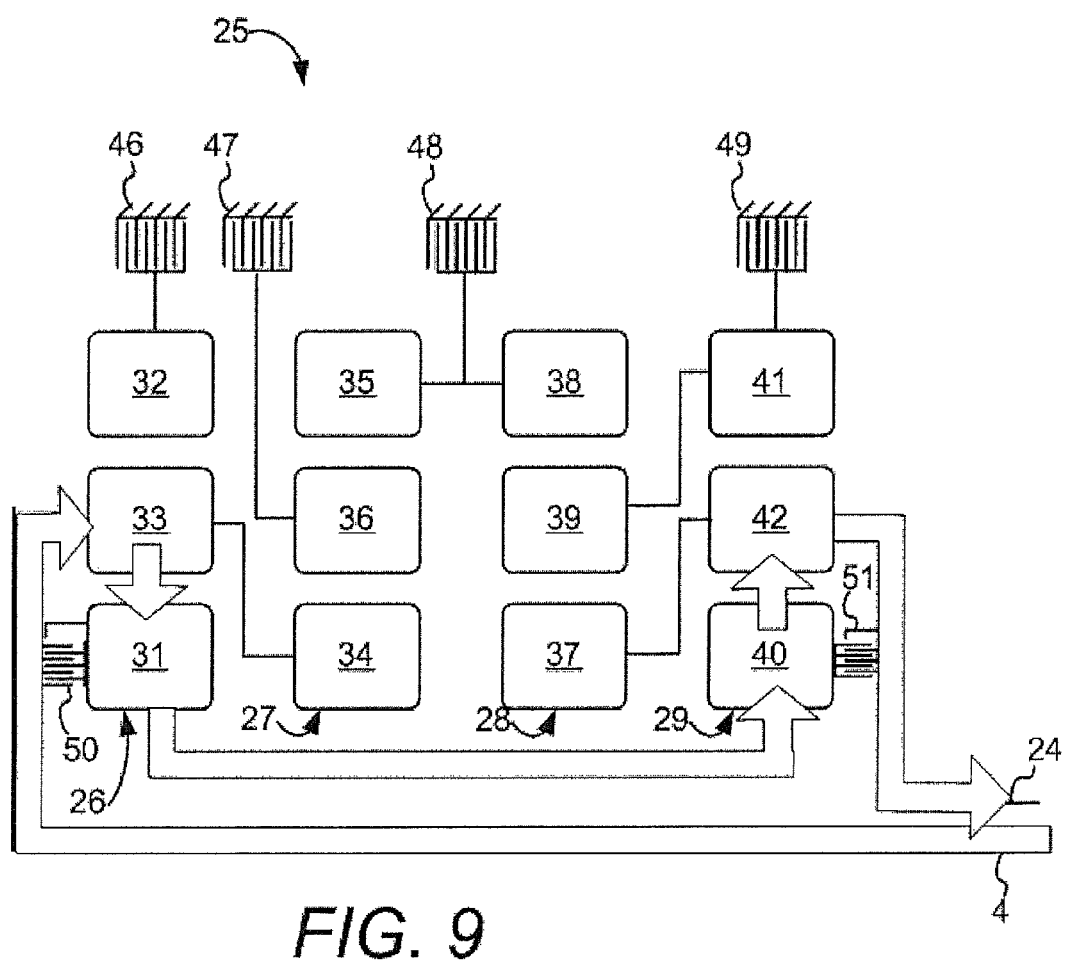
FIG. 9 is a power flow diagram showing the power flow in the transmission of FIG. 2 in a 1R configuration.

Having reviewed the power flow in each of the forward gears, the power flow in each reverse gear will be shown. FIG. 9 illustrates the power flow through the transmission 25 when the transmission is in the 1R state (first reverse gear). The states of the [Second Clutch, First Clutch, Third Brake, Fourth Brake, Second Brake, First Brake] in this state are [Off, Off, Off, On, Off, On] respectively.

Figure 10:
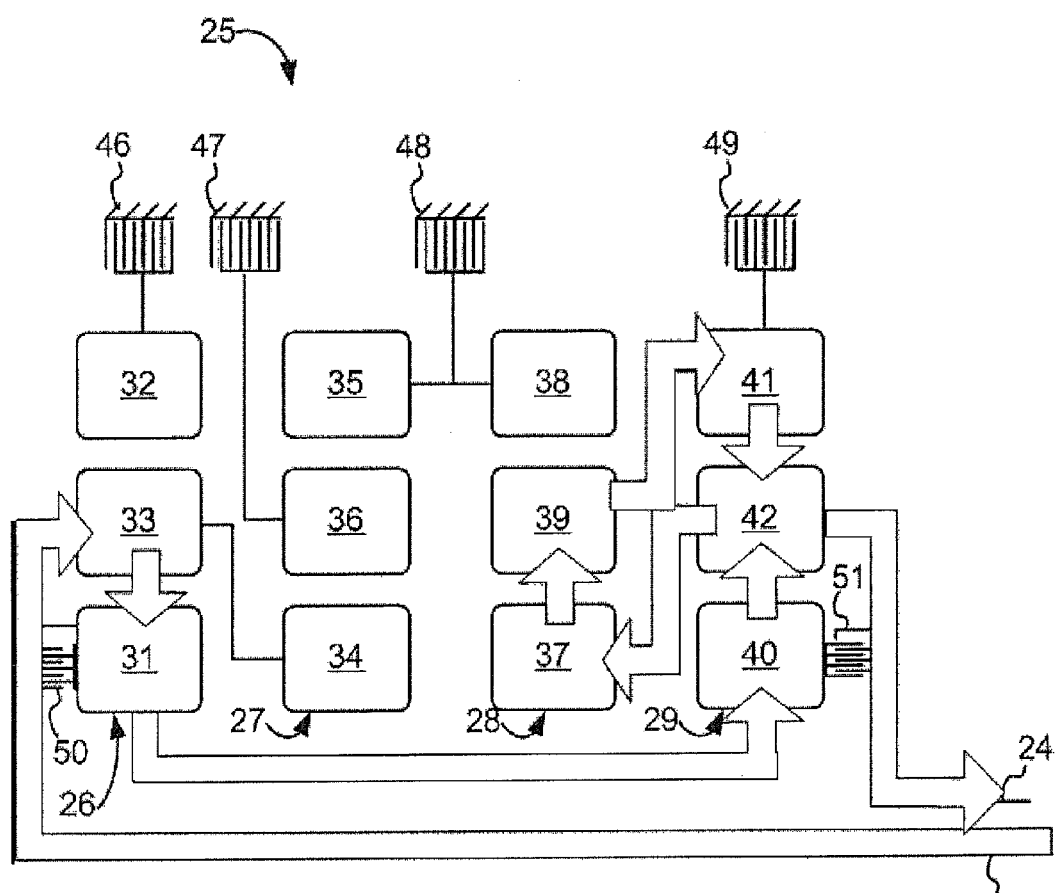
FIG. 10 is a power flow diagram showing the power flow in the transmission of FIG. 2 in a 2R configuration.

The power flow through the transmission 25 when the transmission is in the 2R state (second reverse gear) is shown in FIG. 10. The states of the [Second Clutch, First Clutch, Third Brake, Fourth Brake, Second Brake, First Brake] in this configuration are [Off, Off, On, Off, Off, On] respectively.

Figure 11:
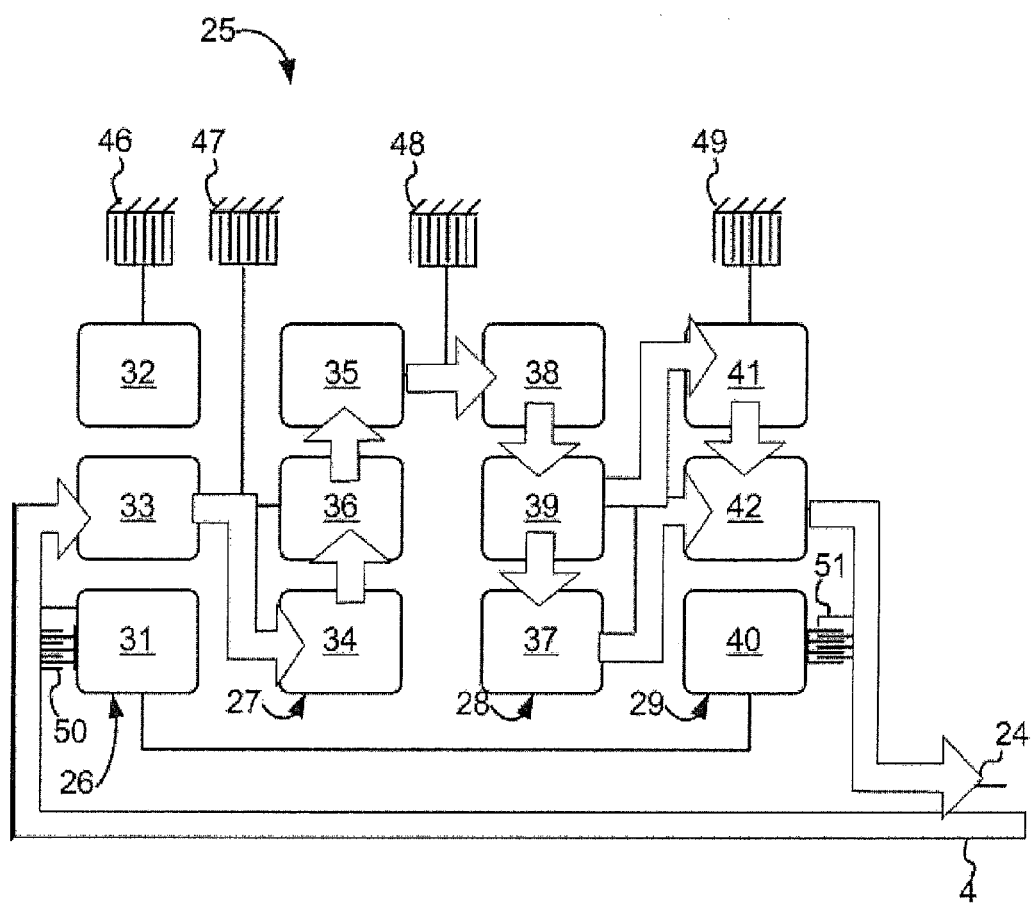
FIG. 11 is a power flow diagram showing the power flow in the transmission of FIG. 2 in a 3R configuration.

In the 3R state (third reverse gear), all four planetary gear sets are again involved in the power flow as shown in FIG. 11. In this state, the configurations of the [Second Clutch, First Clutch, Third Brake, Fourth Brake, Second Brake, First Brake] are [Off, Off, Off, Off, On, On] respectively.

Figure 12:
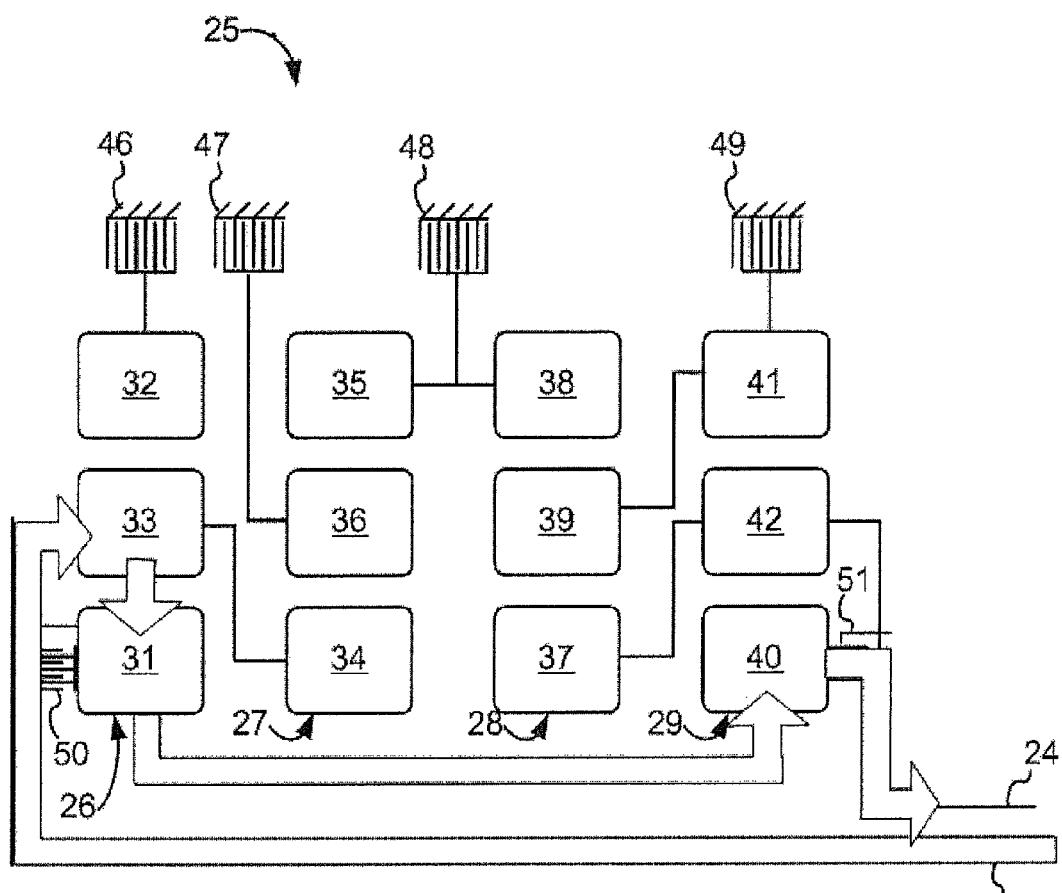
FIG. 12 is a power flow diagram showing the power flow in the transmission of FIG. 2 in a 4R configuration.

The power flow through the transmission 25 in the final reverse state 4R (fourth reverse gear) is shown in the power flow diagram of FIG. 12. In this state, the configurations of the [Second Clutch, First Clutch, Third Brake, Fourth Brake, Second Brake, First Brake] are [On, Off, Off, Off, Off, On] respectively.

It will be appreciated that the precise input/output ratio in each state will depend upon the e-value of each planetary gear set. In the embodiment reflected in the state chart of FIG. 3, the e-value for the first planetary gear set is −2.274, the e-value for the second planetary gear set is 3.207, the e-value for the third planetary gear set is 1.854, and the e-value for the fourth planetary gear set is 2.096. Those of skill in the art will understand that other planetary gear set e-values may be used to change one or more of the gear ratios shown in FIG. 3. Moreover, it will be appreciated that the described principles include trivial variants.

Industrial Applicability

In general terms, the present disclosure sets forth a compact 5-forward/4-reverse transmission applicable to any machine wherein a compact space requirement exists and the indicated number and direction of gears are needed. The described system operates by the selective actuation of four brakes and two rotational clutches. The resultant system provides compact installation and efficient operation. In addition, the close step of the resultant system allows direct drive shifts in the working range.

In addition to being physically compact, the operation of the described transmission is also simplified over many other transmission systems. It will be appreciated that in each forward and reverse gear, only two of the clutches and/or brakes need be actuated. Thus, while the transmission is in any forward or reverse gear, four of the clutches and brakes remain idle.

It will be appreciated that the present disclosure provides a new and useful transmission for use in a variety of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A machine power transmission comprising:
a planetary gear train having exactly four planetary gear sets including a first planetary gear set having a first sun gear, first ring gear, and first carrier, a second planetary gear set having a second sun gear, second ring gear, and second carrier, a third planetary gear set having a third sun gear, third ring gear, and third carrier, and a fourth planetary gear set having a fourth sun gear, fourth ring gear, and fourth carrier;
an input to the planetary gear train and an output from the planetary gear train; and
a first brake, second brake, third brake, fourth brake, first clutch, and second clutch associated with the planetary gear train, the first brake being linked to the first ring gear, the second brake being linked to the second carrier, the third brake being linked to the second ring gear and third ring gear, the fourth brake being linked to the fourth ring gear, the first clutch linking the first sun gear to the input, and the second clutch linking the fourth sun gear to the output, such that selective actuation of one or more of the first brake, second brake, third brake, fourth brake, first clutch, and second clutch provides five forward speeds and four reverse speeds of the transmission.

2. The machine power transmission in accordance with claim 1, wherein each of at least five of the first brake, second brake, third brake, fourth brake, first clutch, and second clutch is actuated for one or more forward speed and for one or more reverse speeds.

3. The machine power transmission in accordance with claim 1, wherein in for each speed, exactly two of the first brake, second brake, third brake, fourth brake, first clutch, and second clutch are actuated.

4. The machine power transmission in accordance with claim 1, wherein a first forward speed is provided by actuation of the first clutch and second brake.

5. The machine power transmission in accordance with claim 1, wherein a second forward speed is provided by actuation of the first clutch and fourth brake.

6. The machine power transmission in accordance with claim 1, wherein a third forward speed is provided by actuation of the first clutch and third brake.

7. The machine power transmission in accordance with claim 1, wherein a fourth forward speed is provided by actuation of the second brake and fourth brake.

8. The machine power transmission in accordance with claim 1, wherein a fifth forward speed is provided by actuation of the first clutch and second clutch.

9. The machine power transmission in accordance with claim 1, wherein a first reverse speed is provided by actuation of the first brake and fourth brake.

10. The machine power transmission in accordance with claim 1, wherein a second reverse speed is provided by actuation of the first brake and third brake.

11. The machine power transmission in accordance with claim 1, wherein a third reverse speed is provided by actuation of the first brake and second brake.

12. The machine power transmission in accordance with claim 1, wherein a fourth reverse speed is provided by actuation of the first brake and second clutch.

13. A planetary gear train comprising:
   first, second, third, and fourth planetary gear sets between an input and an output; and
   first, second, third and fourth brakes and first and second clutches, the first, second, third and fourth brakes and first and second clutches being selectively actuatable to provide five different forward speeds and four different reverse speeds between the input and the output by actuation as follows for each speed:
   first forward speed: first clutch, second brake; second forward speed: first clutch, fourth brake; third forward speed: first clutch, third brake; fourth forward speed: second brake, fourth brake; fifth forward speed: first clutch, second clutch; first reverse speed: first brake, fourth brake; second reverse speed: first brake, third brake; third reverse speed: first brake, second brake; and fourth reverse speed: second clutch, first brake.

14. The planetary gear train in accordance with claim 12, wherein the first planetary gear set includes a first sun gear, first ring gear, and first carrier, the second planetary gear set includes a second sun gear, second ring gear, and second carrier, the third planetary gear set includes a third sun gear, third ring gear, and third carrier, and the fourth planetary gear set includes a fourth sun gear, fourth ring gear, and fourth carrier.

15. The planetary gear train in accordance with claim 13, wherein the first brake is located and configured to selectively brake the first ring gear.

16. The planetary gear train in accordance with claim 13, wherein the second brake is located and configured to selectively brake the second carrier.

17. The planetary gear train in accordance with claim 13, wherein the third brake is located and configured to selectively brake the second ring gear and third ring gear.

18. The planetary gear train in accordance with claim 13, wherein the first clutch is located and configured to selectively tie the first sun gear and first carrier.

19. The planetary gear train in accordance with claim 13, wherein the second clutch is located and configured to selectively tie the fourth sun gear and fourth carrier.

20. A compact transmission providing five forward speeds and four reverse speeds, the compact transmission comprising:
   a first planetary gear set having a first sun gear, first ring gear, and first carrier, a second planetary gear set having a second sun gear, second ring gear, and second carrier, a third planetary gear set having a third sun gear, third ring gear, and third carrier, and a fourth planetary gear set having a fourth sun gear, fourth ring gear, and fourth carrier;
   an input to the planetary gear train and an output from the planetary gear train; and
   a first brake, second brake, third brake, fourth brake, first clutch, and second clutch associated with the planetary gear train, the first brake, second brake, third brake, fourth brake, first clutch, and second clutch being configured such that setting each of the five forward speeds and each of the four reverse speeds of the compact transmission requires the actuation of exactly two of the first brake, second brake, third brake, fourth brake, first clutch, and second clutch.

* * * * *

UNITED STATES PATENT AND TRADEMARK OFFICE
CERTIFICATE OF CORRECTION

PATENT NO. : 8,840,519 B2
APPLICATION NO. : 13/567636
DATED : September 23, 2014
INVENTOR(S) : Koch et al.

It is certified that error appears in the above-identified patent and that said Letters Patent is hereby corrected as shown below:

In the Specification

Column 5, line 56, delete "Industrial Applicability" and insert -- INDUSTRIAL APPLICABILITY --.

Signed and Sealed this
Eighth Day of September, 2015

Michelle K. Lee
*Director of the United States Patent and Trademark Office*